United States Patent
Rapaport et al.

(10) Patent No.: US 12,299,426 B2
(45) Date of Patent: May 13, 2025

(54) VECTORIZING A LOOP

(71) Applicant: Mobileye Vision Technologies Ltd., Jerusalem (IL)

(72) Inventors: Gil Rapaport, Moledet (IL); Ayal Zaks, Mitzpe Aviv (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 58 days.

(21) Appl. No.: 18/284,752

(22) PCT Filed: Mar. 28, 2022

(86) PCT No.: PCT/IB2022/000188
§ 371 (c)(1),
(2) Date: Sep. 28, 2023

(87) PCT Pub. No.: WO2022/208173
PCT Pub. Date: Oct. 6, 2022

(65) Prior Publication Data
US 2024/0184554 A1 Jun. 6, 2024

Related U.S. Application Data

(60) Provisional application No. 63/169,500, filed on Apr. 1, 2021.

(51) Int. Cl.
*G06F 8/41* (2018.01)
(52) U.S. Cl.
CPC .................................. *G06F 8/452* (2013.01)
(58) Field of Classification Search
None
See application file for complete search history.

(56) References Cited

U.S. PATENT DOCUMENTS

| 6,374,403 B1 * | 4/2002 | Darte | G06F 8/45 |
| | | | 717/161 |
| 2005/0097301 A1 * | 5/2005 | Ben-David | G06F 8/41 |
| | | | 712/35 |

(Continued)

FOREIGN PATENT DOCUMENTS

| KR | 102322124 B1 * | 11/2021 |
| WO | WO-2019005165 A1 | 1/2019 |

(Continued)

OTHER PUBLICATIONS

"International Application Serial No. PCT/IB2022/000188, International Search Report mailed Sep. 23, 2022", 2 pgs.

(Continued)

*Primary Examiner* — Philip Wang
(74) *Attorney, Agent, or Firm* — Schwegman Lundberg & Woessner, P.A.

(57) ABSTRACT

A method includes: receiving input code that comprises a loop that operates on a first array of elements and a second array of elements, wherein during an iteration of the loop a first operation is performed on an element of the first array of elements, or a second operation is performed on an element of the second array of elements; generating a first compound operation that operates on a predetermined number of elements of the first array of elements, the first compound operation resulting in a first intermediate vector; generating a second compound operation that operates on the predetermined number of elements of the second array of elements, the second compound operation resulting in a second intermediate vector; interleaving the first intermediate vector and the second intermediate vector and storing the interleaved result in a temporary vector; and summing the interleaved result in the temporary vector using an order-preserving sum.

26 Claims, 4 Drawing Sheets

(56) References Cited

U.S. PATENT DOCUMENTS

| | | | |
|---|---|---|---|
| 2011/0029962 A1* | 2/2011 | Nuzman | G06F 8/452 717/160 |
| 2014/0095850 A1* | 4/2014 | Plotnikov | G06F 8/452 712/241 |
| 2014/0201450 A1 | 7/2014 | Haugen | |
| 2015/0268940 A1* | 9/2015 | Baghsorkhi | G06F 8/452 717/160 |
| 2017/0214415 A1* | 7/2017 | Kokubun | H03M 13/27 |
| 2018/0034482 A1* | 2/2018 | Wu | H03M 13/152 |
| 2018/0157471 A1* | 6/2018 | Venkataramani | G06F 8/4434 |
| 2020/0210183 A1* | 7/2020 | Burylov | G06F 9/3838 |

FOREIGN PATENT DOCUMENTS

| | | |
|---|---|---|
| WO | WO-2022208173 A2 | 10/2022 |
| WO | WO-2022208173 A3 | 10/2022 |

OTHER PUBLICATIONS

"International Application Serial No. PCT/IB2022/000188, Written Opinion mailed Sep. 23, 2022", 7 pgs.

\* cited by examiner

VECTORIZING A LOOP

CLAIM OF PRIORITY

This patent application is a U.S. National Stage Application under 35 U.S.C. 371 from International Application No. PCT/IB2022/000188, filed Mar. 28, 2022, and published as WO 2022/208173 on Oct. 6, 2022, which claims the benefit of priority, under 35 U.S.C. § 119 (e), to U.S. Provisional Patent Application Ser. No. 63/169,500, titled "Vectorizing a Loop," filed on Apr. 1, 2021, which are hereby incorporated by reference herein in their entirety.

BACKGROUND

In various programming paradigms, a loop may include a loop body and repetition criteria for controlling repetitions of the loop body. The loop body includes a sequence of instructions that are repeated or iterated through until a condition causes the loop to terminate. The repetition criteria may be a number of iterations based on the number of data to processed, elapsed time, or other control variable.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

The illustrated embodiments of the present invention may for the most part, be implemented using electronic components and circuits known to those skilled in the art, therefore—details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by the memory device and should be applied mutatis mutandis to a non-transitory computer readable medium that stores instructions that may be executed by the memory device.

Any reference in the specification to a non-transitory computer readable medium should be applied mutatis mutandis to a method that includes executing the instructions stored in the non-transitory computer readable medium, and should be applied mutatis mutandis to a system capable of executing the instructions stored in the non-transitory computer readable medium.

A programming loop includes a loop body and loop control. The loop body may include reduction operations. A reduction operation is one that receives input data units and provides an output result that has a memory size that is smaller than an aggregate size of the input data units. An input data unit may be a single bit data unit or a multi bit data unit. The data unit may be a pixel of an image, or any other type of data units.

An example of a reduction operation is a sum operation that is applied on an array of input data units, where the reduction operation provides a sum result that is stored in a memory unit that is smaller than the overall size of the array. The array may be a one dimensional array (vector) or a multi-dimensional array. Other non-limiting reduction operations include subtraction, multiplication, division, and the like.

Different reduction operations may be associated with different groups of data units. The group of data units may be an array, a part of a data record, a data record, and the like.

Reduction operations may be order-sensitive. Such reduction operations may be referred as order-sensitive reduction operations. The reduction operations may be applied based on a condition. Such reduction operations may be referred to as conditional reduction operations. Accordingly, the reduction operations in a loop body may be order-sensitive reduction operations, non-order sensitive reduction operations, conditional reduction operations, non-conditional reduction operations, or some combination of these types of reduction operations.

In the first pseudo-code listing named "example_1", the variables are floating point operations and thus the reduction operations are order-sensitive. If the variables were of type integer, then because of the commutative property in math, the reduction operations would not be order sensitive. The first pseudo-code "example_1" does not include conditional reduction operations.

```
float example_1(int N, float *A, float *B)
{
    float Sum = 0.0;
    for (int i=0; i<N; i++)
    {
        Sum += (A[i]*2.5);
        Sum += (B[i]*3.5);
    }
    return Sum;
}
```

In this case, for each value of index i, the Sum variable is first updated by adding the current Sum to the i'th element of array A multiplied by the constant value 2.5, and then updated again by adding the i'th element of array B multiplied by the constant value 3.5. This is an order-sensitive operation in which elements of different arrays (vectors) are added to the variable Sum in an interleaved manner.

The following second pseudo-code "example_2" illustrates a loop that includes a loop body that includes conditional and order-sensitive reduction operations:

```
float example_2(int N, int *Cond, float *A, float *B)
{
    float Sum = 0.0;
    for (int i=0; i<N; i++)
    {
        if (Cond[i])
            Sum+=(A[i]*2.5);
        else
            Sum+=(B[i]*3.5);
    }
    return Sum;
}
```

In the second pseudo-code, the variables are floating point operations and thus the reduction operations are order-sensitive. A sum variable is denoted Sum and it is updated during each iteration of the loop body, based on the evaluation of logical conditions per iteration. Thus, the reduction operations are also conditional reduction operations.

For each value of index i (between 0 and N−1) a Sum variable is updated by adding the current value of Sum to the i'th element of A (A[i]) multiplied by the constant value 2.5 when the array contents of Cond[i] evaluates to a logical TRUE or adding the current value of Sum to the i'th element of B (B[i]) multiplied by a constant value 3.5 when the array contents of Cond[i] evaluates to logical FALSE. The Cond[i] array includes a numerical value 1 to represent logic TRUE and a numerical value 0 to represent logic FALSE. It is understood that other arrays may be used, such as a character array.

Vectorizing involves executing multiple operations in parallel. Vectorizing the loop illustrated in "example_2" is challenging due to the conditional and order-sensitive reduction operations. For example, existing vectorization techniques such as partial sums, which inherently reorder the operations, produce a different result.

What is needed is a vectorization technique that maintains order-sensitive operations. The operations may be applied based on one or more conditions. The systems and methods described here produce vectorized output code that preserves the order of the operations.

In general, the loop operations depicted in the pseudocode of example_1 and example_2 may be vectorized so that operations may be executed in parallel on elements of the data structure to produce sub-combinations. The sub-combinations are produced using intermediate operations. These sub-combinations are then combined in an manner that preserves the order of the operations. The data structure may be an array, a linked list, a stack, a queue, or any other aggregate data structure that may be iterated through in a loop.

The following third pseudo-code is an example of an outcome of vectorizing the first pseudo-code according to an implementation.

```
float example_3(int N, float *A, float *B)
{
    float Sum = 0.0;
    for (int i=0; i<N; i+=4)
    {
        TA[0:3] = (A[i:i+3] * <2.5, 2.5, 2.5, 2.5>);
        TB[0:3] = (B[i:i+3] * <3.5, 3.5, 3.5, 3.5>);
        Tmp[0:7] =
            <TA[0],TB[0],TA[1],TB[1],TA[2],TB[2],TA[3],TB[3]>;
        Sum = reduce_in_order(Sum, Tmp[0:7]);
    }
    return Sum;
}
```

The third pseudo-code operates on chunks of four data units per iteration of the loop body. The size of the chunks may be based on hardware assets available to the executable code. For instance, depending on the number of available processor cores, memory registers, or other aspects of hardware, more or fewer elements may be processed in parallel. Thus, the loop may operate on less than four data units per iteration, or on more than four data units per iteration. Vectors A and B are two groups of data units. There may be more than two groups of data units.

Further, the vectors in a loop body may include a group of data units of a different sizes. For instance, vector A can be a group of 8 data units and vector B can be a group of 4 data units. In such an example, a loop vectorizer may load multiples from one group with singles of another group. For example, the summation operations may resemble:

for (i=0, i<4, i++){sum+=2.5*A[2*i]+2.5*A[2*i+1]+ 3.5*B[i];}

In this way, two values from vector A are summed with one value from vector B during each iteration. When vectorizing the loop, the indexes of vector A are manipulated to include multiple values from vector A during each iteration. The vectorized loop may be chunked in groups of some common factor of the numbers of elements of each group.

The vectorizing that generates the third pseudo-code replaces the reduction operations Sum+=(A[i]*2.5) and Sum+=(B[i]*3.5) by two first intermediate operations and at least one second operation. The second operation is used as an aggregation operation that ensures preservation of operation order.

In the example illustrated in example_3 pseudocode, the intermediate operations are vectorized operations that apply the mathematical operation (here it is multiplication) to each of the four entries in the A or B array using the values inside of the less than and greater than signs ("<" and ">", respectively).

The two first intermediate operations are TA[0:3]=(A[i: i+3] *<2.5, 2.5, 2.5, 2.5>) and TB[0:3]=(B[i:i+3] *<3.5, 3.5, 3.5, 3.5>). These operations can be executed in parallel to each other.

TA[0:3]=(A[i:i+3] *<2.5, 2.5, 2.5, 2.5>) includes calculating and storing in a first buffer (TA) the outcome of multiplying four selected data units of vector A by the constant value 2.5 to provide a four first intermediate results, stored in TA[0], TA[1], TA[2] and TA[3].

TB[0:3]=(B[i:i+3] *<3.5, 3.5, 3.5, 3.5>) includes calculating and storing in a second buffer (TB) the outcome of multiplying four selected data units of vector B by the constant value 3.5 to provide a four second intermediate results, stored in TB[0], TB[1], TB[2] and TB[3].

The calculation and storage of the four first intermediate results can be executed in parallel to the calculation and storage of the four second intermediate results. The first intermediate results may be calculated in parallel to each other. The second intermediate results may be calculated in parallel to each other.

The at least one second operation include Tmp[0:7]=<TA[0],TB[0], TA[1],TB[1], TA[2], TB[2], TA[3], TB[3]>, and Sum=reduce_in_order(Sum, Tmp[0:7]).

Tmp[0:7]=<TA[0],TB[0],TA[1],TB[1], TA[2], TB[2], TA[3], TB[3]> includes retrieving from buffers TA and TB, in an interleaved manner, first and second intermediate results respectively and storing them in a buffer Tmp[0:7].

The second operations include copying the values from the A and B arrays to a temporary array, Tmp, in the order that the values should be summed, and a summation or aggregation operation, "reduce_in_order".

The reduce_in_order function may be a processor function supported by hardware. The reduce_in_order function may sum each of the elements in the Tmp array in the order of the Tmp array in a manner that is accelerated by hardware. The reduce_in_order function may resemble the code:

for (i=0; i<size(V); i++){sum+=V[I];}

Sum=reduce_in_order(Sum, Tmp[0:7]) is an order preserving sum of the current sum value (before executing the current repetition of the loop body) and the elements of Tmp[0:7]. This Sum is provided and updated per repetition of the loop body.

The following fourth, fifth and sixth pseudo-codes are various examples of vectorizing the second pseudo-code, example_2, from above.

```
float example_4(int N, int *Cond, float *A, float *B)
{
  float Sum = 0.0;
  for (int i=0; i<N; i+=4)
  {
    TA[0:3] = (A[i:i+3] * <2.5, 2.5, 2.5, 2.5>);
    TB[0:3] = (B[i:i+3] * <3.5, 3.5, 3.5, 3.5>);
    Tmp[0:7] =
      <TA[0],TB[0],TA[1],TB[1],TA[2],TB[2],TA[3],TB[3]>;
    C_F[0:3] = (Cond[i:i+3])
    Sum = reduce_in_order(Sum, Tmp[0:7], C_F[0:3]);
  }
  return Sum;
}
float example_5(int N, int *Cond, float *A, float *B)
{
  float Sum = 0.0;
  for (int i=0; i<N; i+=4)
  {
    T[0][0:3] = (A[i:i+3] * <2.5, 2.5, 2.5, 2.5>);
    T[1][0:3] = (B[i:i+3] * <3.5, 3.5, 3.5, 3.5>);
    C_F[0:3] =(Cond[i:i+3]);
    Tmp[0:3] = <T[C_F[0]][0], T[C_F[1]][1], T[C_F[2]][2],
      T[C_F[3]][3]>;
    Sum = reduce_in_order(Sum, Tmp[0:3]);
  }
  return Sum;
}
float example_6(int N, int *Cond, float *A, float *B)
{
  float Sum = 0.0;
  for (int i=0; i<N; i+=4)
  {
    TA[0:3] = (A[i:i+3] * <2.5, 2.5, 2.5, 2.5>);
    TB[0:3] = (B[i:i+3] * <3.5, 3.5, 3.5, 3.5>);
    C_F[0:3] = (Cond[i:i+3]);
    Tmp[0:7] = <TA[0]*C_F[0], TB[0]*NOT-C_F[0]...
      TA[3]*C_F[3], TB[3]*NOT-C_F[3])>;
    Sum = reduce_in_order(Sum, Tmp[0:7]);
  }
  return Sum;
}
```

The fourth, fifth and sixth pseudo-codes take into account the conditional summation of the A and B arrays using various mechanisms.

In the fourth pseudo-code the temp register, Tmp, stores the four first intermediate results and the four second intermediate results in an interleaved manner. The sum operation is applied on selected intermediate results based on the conditional array, Cond[ ], which is copied into the conditional fulfilment array, C_F[ ]. The conditional array may be supported directly by hardware. In some embodiments, the conditional array Cond[ ] is used directly, instead of copying its contents to conditional fulfilment array C_F[ ]. In such an embodiment, the call to the reduce_in_order process may be altered, such as in example_4, "Sum=reduce_in_order(Sum, Tmp[0:7], Cond[i:i+3]);" or the use of the conditional array in example_5 may be "Tmp[0:3]=<T[Cond[i]][0], T[Cond[i+1]][1], T[Cond[i+2]][2], T[Cond[i+3]][3]>;" In the fifth pseudocode the temp register stores the only four intermediate results that were selected based on condition fulfilment metadata stored in C_F[ ].

In the sixth pseudo-code the temp register stored the four intermediate results that were selected based on condition fulfilment metadata and stores a default value (for example zero for sum) for the unselected four intermediate results.

It is understood that the examples illustrated in the fourth through sixth pseudocode are non-limiting. Other mechanisms may be used to incorporate the conditional reduction operations. Additionally, when there are three or more arrays to be conditionally combined, alternative values may be used to control which array is incorporated into the final sum.

Figure 1:
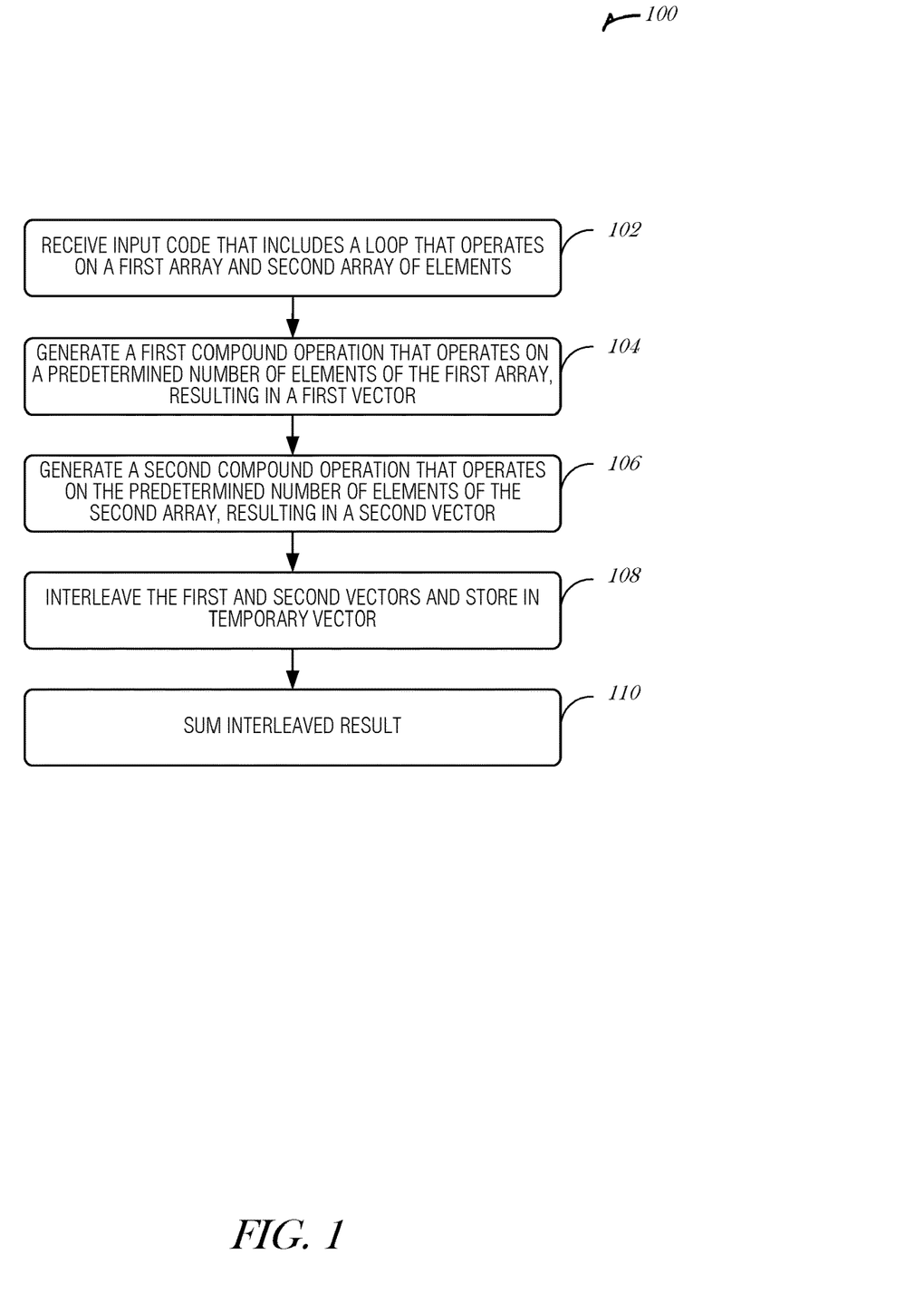
FIG. 1 is a flowchart illustrating a method for vectorizing a loop, according to an embodiment.

FIG. 1 is a flowchart illustrating a method 100 for vectorizing a loop, according to an embodiment. The method 100 may be performed by computational hardware (e.g., processing circuits or circuitry), such as that described above or below.

At 102, input code is received, by a compiler operating on a computing system, where the input code comprises a loop that operates on a first array of elements and a second array of elements. During an iteration of the loop a first operation is performed on an element of the first array of elements, or a second operation is performed on an element of the second array of elements.

At 104, a first compound operation is generated that operates on a predetermined number of elements of the first array of elements, the first compound operation resulting in a first intermediate vector, where the first compound operation is executed in parallel in hardware.

In an embodiment, the first compound operation performed on the elements of the first array of elements is an aggregation operation. In a further embodiment, the aggregation operation comprises multiplying the element of the first array with a constant value to obtain a result, and adding the result to a running sum.

At 106, a second compound operation is generated that operates on the predetermined number of elements of the second array of elements, the second compound operation resulting in a second intermediate vector, where the second compound operation is executed in parallel in hardware.

At 108, the first intermediate vector and the second intermediate vector are interleaved, and the interleaved result is stored in a temporary vector.

At 110, the interleaved result in the temporary vector is summed using an order-preserving sum.

In an embodiment, the input code includes a third array of logical elements to control whether to execute the first compound operation or the second compound operation, for a given index of the third array, first array, and second array. In a further embodiment, summing the interleaved result uses the predetermined number of elements of the third array of logical elements that correspond to the predetermined number of elements of the first array and the predetermined number of elements of the second array, to conditionally sum an element from the first or second intermediate vector.

In another embodiment, interleaving the first intermediate vector and the second intermediate vector and storing the interleaved result in the temporary vector comprises interleaving elements of the first intermediate vector and the second intermediate vector conditionally, based on a corresponding predetermined number of elements of the third array of logical elements.

Figure 2:
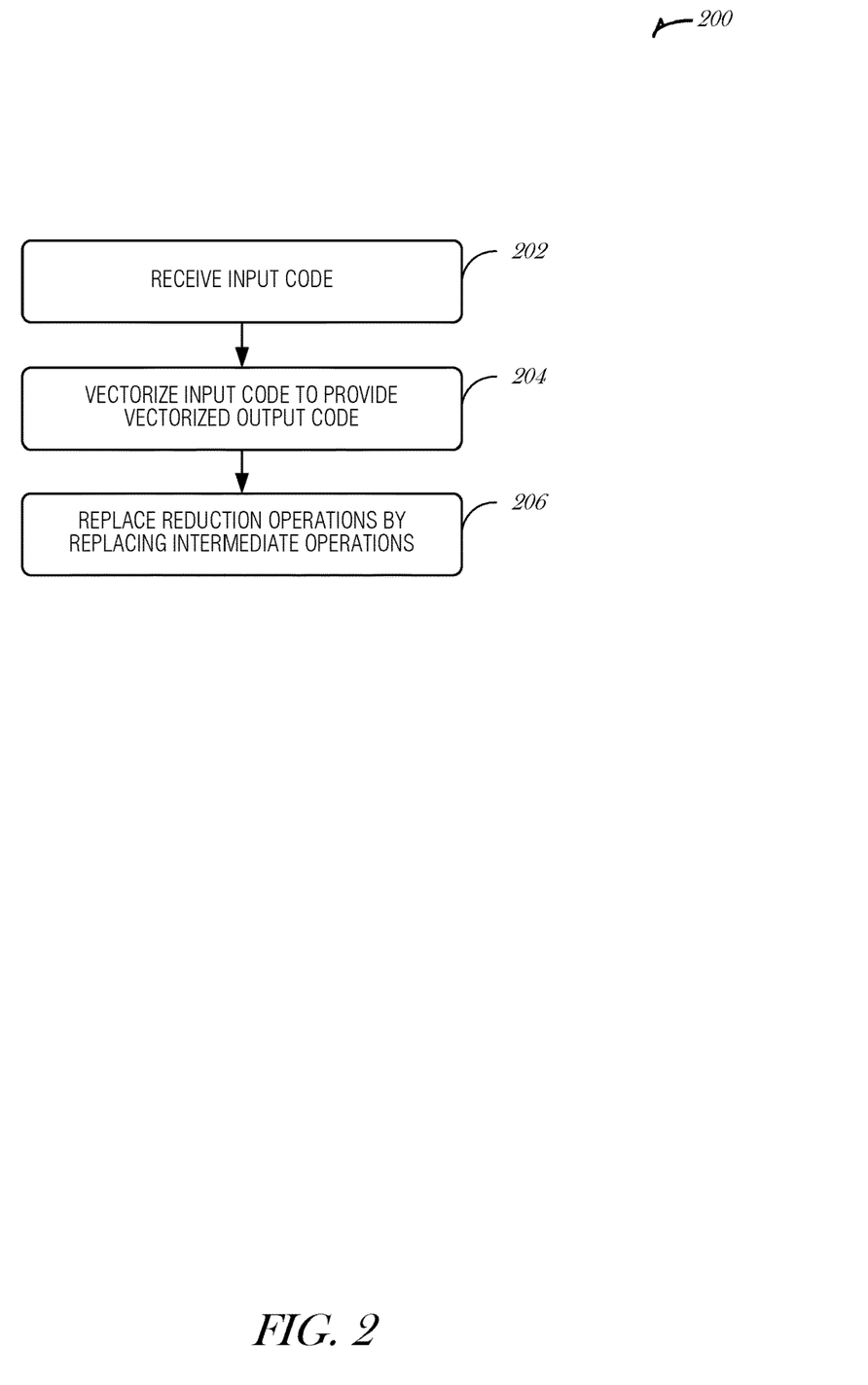
FIG. 2 is a flowchart illustrating a method for vectorizing a loop, according to an embodiment.

FIG. 2 is a flowchart illustrating a method 200 for vectorizing a loop, according to an embodiment. The method 200 may be performed by computational hardware (e.g., processing circuits or circuitry), such as that described above or below.

At operation 202, a compiler receives an input code that includes a loop body and a repetition criterion for controlling repetitions of the loop body. The loop body includes reduction operations.

At operation 204, the compiler vectorizes the input code to provide a vectorized output code.

At operation 206, the reduction operations within the loop body are replaced by replacing intermediate reduction operations. The replaced intermediate reduction operations may include one or more first intermediate operations and at least one second reduction operation. The one or more first intermediate operations are for calculating intermediate results, where each intermediate reduction operation may be associated with a unique group of data units and are parallelly-executable.

In an embodiment, the at least one second reduction operation may be executed within the loop body following a completion of an execution of the one or more first intermediate operations.

In an embodiment, the at least one second reduction operation may include retrieval of the intermediate results and further processing of the intermediate results.

In an embodiment, the one or more first intermediate operations may be order-sensitive, and the retrieval may be an order-preserving retrieval. In another embodiment, the one or more first intermediate operations may be sum operations that involve adding elements of different input vectors to a sum variable.

Figure 3:
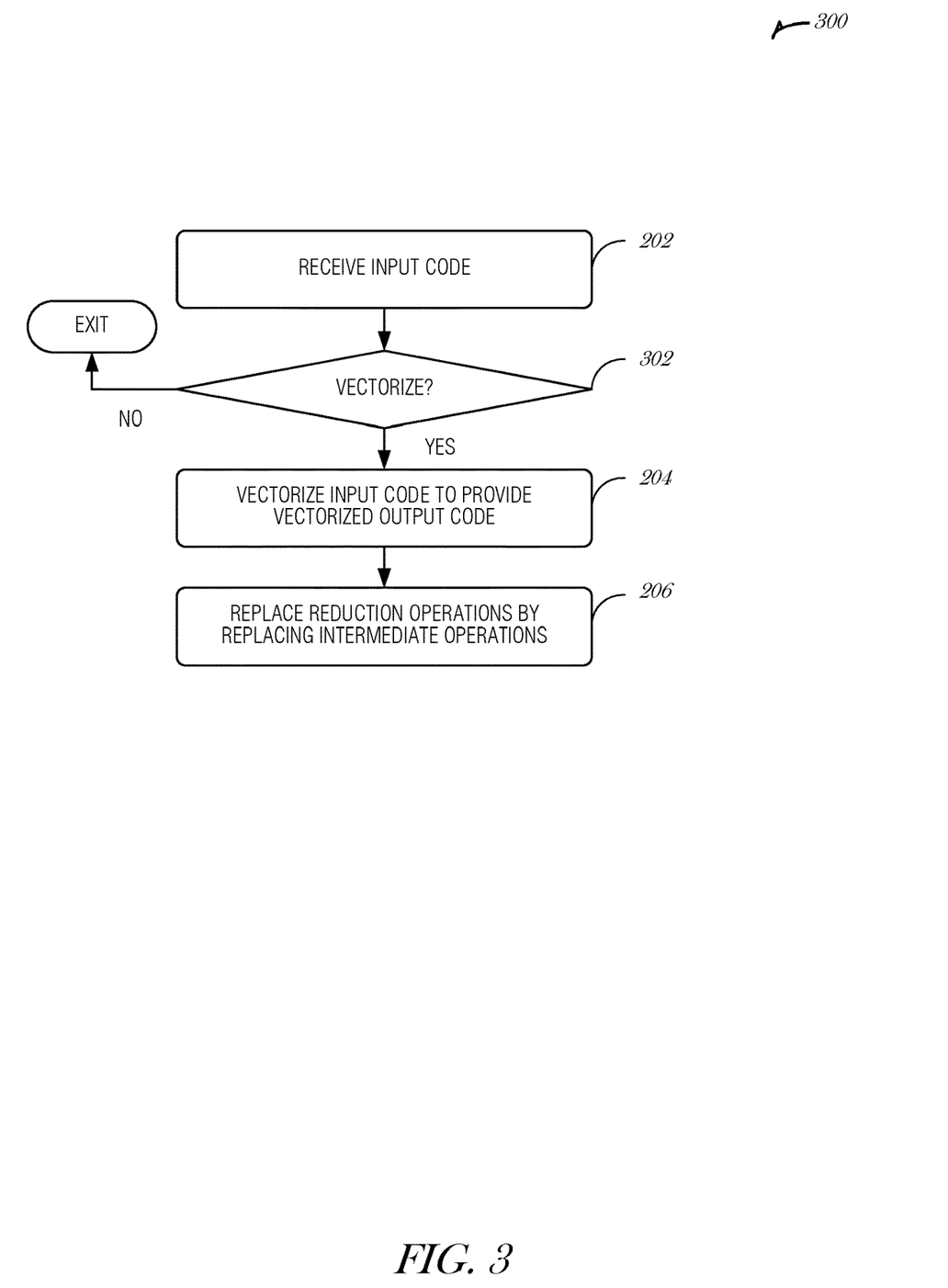
FIG. 3 is a flowchart illustrating a method for vectorizing a loop, according to an embodiment.

FIG. 3 is a flowchart illustrating a method 300 for vectorizing a loop, according to an embodiment. The method 300 may be performed by computational hardware (e.g., processing circuits or circuitry), such as that described above or below. The method 300 is similar to method 200, except that there is a decision point (operation 302) for whether to perform the vectorizing.

If the result of the decision is to perform vectorizing, then the method 300 continues to operation 204. Otherwise, the method 300 completes without vectorizing the loop.

The determination operation 302 can be done by the compiler, with or without any external request, command, or trigger to vectorize. Alternatively, the compiler may be requested, by a user or a computerized entity, to perform the vectorizing. The determination can be done by a human (for example a user that wishes to compile a program), or by a computerized entity that differs from the compiler.

The determination of whether to perform the vectorizing may be done in any manner, for example, by checking whether a certain code can be vectorized (for example whether it includes instructions that can be executed in parallel), or whether the vectorizing provides a code that its execution is more efficient and/or faster and/or complies with any criterion in relation to the code (when not vectorized). A cost function may be used to determine whether it is advantageous to vectorize. Such cost functions are challenging to model as they try to estimate various processor resource availability; but they are vital for vectorization (and other compiler optimizations) to be profitable and avoid slowdowns.

Cost functions may weigh the time of execution of the iterative looping code versus the time of execution of a vectorized formula. A pre-compiler or compiler routine may perform this function. The cost function may be modified, scaled, or based on the number of processing pipelines available for parallelization, the memory available, thread priority, or other factors that are used in instruction handling. In embodiments, the cost function may be a total number of instructions, or a total latency in number of cycles expected for scalar versus vector instructions, accounting for possible overheads associated with vectorization.

The pseudocodes includes vectors (allocation of memory space) of known sizes. It should be noted that the size may be known in advance (for example—four elements for TA and TB)—but the size may also be determined at runtime.

The method 300 may include modifying the code to reduce memory consumption. For example, attempting to minimize a size of one or more buffers used to store intermediate results, metadata, and the like.

The techniques described herein may be executed by a system that includes one or more processing circuits and one or more memory units. The vectorized output code may be executed by a system that includes one or more processing circuits and one or more memory units. The one or more processing circuits may execute multiple operations in parallel. The parallel execution may increase the throughput of the system.

Each processing circuit may be or may include a hardware accelerator, a general purpose unit, a central processing unit (CPU), a system on chip (SOC), an image processor, a graphic processing unit (GPU), a field programmable gate array (FPGA), an application specific integrated circuit (ASIC), a neural network processor, a single core processor, a multi-core processor, and the like.

Any memory unit may be implemented using any known technologies such as a volatile or nonvolatile memory including semiconductor-based memory units such as flash memory, EEPROM, EPROM, ROM; ferromagnetic digital memories; MRAM; volatile storage media including registers, buffers or caches, main memory, RAM, DRAM, SRAM, etc. A memory unit may belong to a processing circuit or may be located outside the processing circuit.

There are provided systems, methods, as illustrated in the claims and the specification. Any combination of any subject matter of any claim may be used to implement the techniques described herein. Any combination of any method and/or method step disclosed in any figure and/or in the specification may be used to implement the techniques described herein. Any combination of any unit, device, and/or component disclosed in any figure and/or in the specification may be used to implement the techniques described herein.

Any of method describing steps may include more steps than those illustrated in the figure, only the steps illustrated in the figure or substantially only the steps illustrate in the figure. The same applies to components of a device, processor or system and to instructions stored in any non-transitory computer readable storage medium.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media. A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 4:
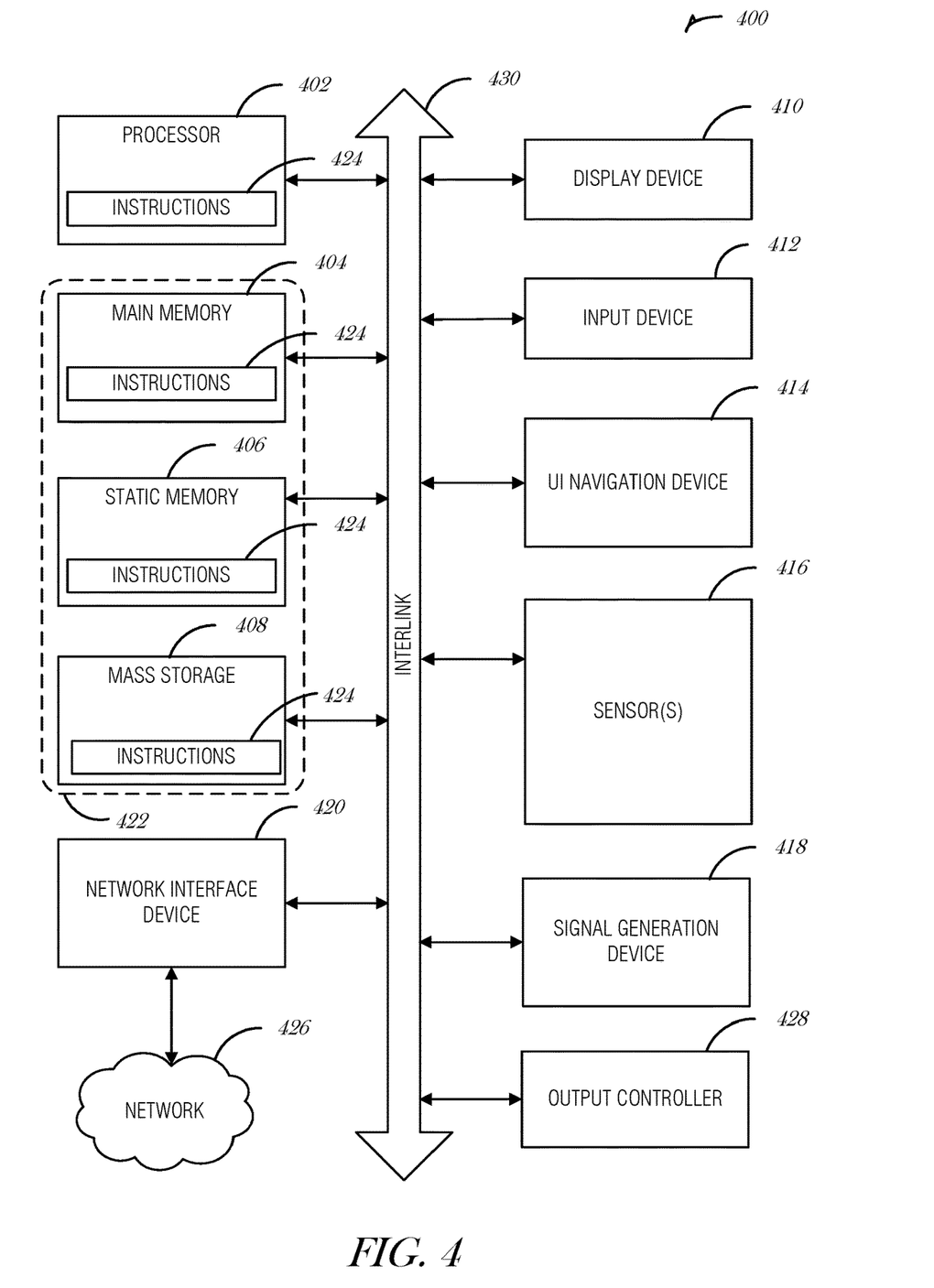
FIG. 4 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 4 is a block diagram illustrating a machine in the example form of a computer system 400, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, gyrometer, magnetometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include nonvolatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a method for vectorizing a loop, the comprising: receiving, by a compiler operating on a computing system, input code that comprises a loop that operates on a first array of elements and a second array of elements, wherein during an iteration of the loop a first operation is performed on an element of the first array of elements, or a second operation is performed on an element of the second array of elements; generating a first compound operation that operates on a predetermined number of elements of the first array of elements, the first compound operation resulting in a first intermediate vector, wherein the first compound operation is executed in parallel in hardware; generating a second compound operation that operates on the predetermined number of elements of the second array of elements, the second compound operation resulting in a second intermediate vector, wherein the second compound operation is executed in parallel in hardware; interleaving the first intermediate vector and the second intermediate vector and storing the interleaved result in a temporary vector; and summing the interleaved result in the temporary vector using an order-preserving sum.

In Example 2, the subject matter of Example 1 includes, wherein the first compound operation performed on the elements of the first array of elements is an aggregation operation.

In Example 3, the subject matter of Example 2 includes, wherein the aggregation operation comprises multiplying the element of the first array with a constant value to obtain a result, and adding the result to a running sum.

In Example 4, the subject matter of Examples 1-3 includes, wherein the input code includes a third array of logical elements to control whether to execute the first compound operation or the second compound operation, for a given index of the third array, first array, and second array.

In Example 5, the subject matter of Example 4 includes, wherein summing the interleaved result uses the predetermined number of elements of the third array of logical elements that correspond to the predetermined number of elements of the first array and the predetermined number of elements of the second array, to conditionally sum an element from the first or second intermediate vector.

In Example 6, the subject matter of Examples 4-5 includes, wherein interleaving the first intermediate vector and the second intermediate vector and storing the interleaved result in the temporary vector comprises interleaving elements of the first intermediate vector and the second intermediate vector conditionally, based on a corresponding predetermined number of elements of the third array of logical elements.

Example 7 is a non-transitory computer-readable medium for vectorizing a loop, including instructions, which when executed by a computer, cause the computer to perform operations comprising: receiving, by a compiler operating on a computing system, input code that comprises a loop that operates on a first array of elements and a second array of elements, wherein during an iteration of the loop a first operation is performed on an element of the first array of elements, or a second operation is performed on an element of the second array of elements; generating a first compound operation that operates on a predetermined number of elements of the first array of elements, the first compound operation resulting in a first intermediate vector, wherein the first compound operation is executed in parallel in hardware; generating a second compound operation that operates on the predetermined number of elements of the second array of elements, the second compound operation resulting in a second intermediate vector, wherein the second compound operation is executed in parallel in hardware; interleaving the first intermediate vector and the second intermediate vector and storing the interleaved result in a temporary vector; and summing the interleaved result in the temporary vector using an order-preserving sum.

In Example 8, the subject matter of Example 7 includes, wherein the first compound operation performed on the elements of the first array of elements is an aggregation operation.

In Example 9, the subject matter of Example 8 includes, wherein the aggregation operation comprises multiplying the element of the first array with a constant value to obtain a result, and adding the result to a running sum.

In Example 10, the subject matter of Examples 7-9 includes, wherein the input code includes a third array of logical elements to control whether to execute the first compound operation or the second compound operation, for a given index of the third array, first array, and second array.

In Example 11, the subject matter of Example 10 includes, wherein summing the interleaved result uses the predetermined number of elements of the third array of logical elements that correspond to the predetermined number of elements of the first array and the predetermined number of elements of the second array, to conditionally sum an element from the first or second intermediate vector.

In Example 12, the subject matter of Examples 10-11 includes, wherein interleaving the first intermediate vector and the second intermediate vector and storing the interleaved result in the temporary vector comprises interleaving elements of the first intermediate vector and the second intermediate vector conditionally, based on a corresponding predetermined number of elements of the third array of logical elements.

Example 13 is a method for vectorizing a loop, the method comprising: receiving, by a compiler, an input code that comprises a loop body and a repetition criterion for controlling repetitions of the loop body; wherein the loop body comprises reduction operations and additional operations, wherein different reduction operations are associated with different groups of data units, and wherein the reduction operations are at least one out of (a) conditional reduction operations, and (b) order-sensitive reduction operations; and vectorizing, by the compiler, the input code to provide a vectorized output code, wherein the vectorizing comprises: replacing the reduction operations within the loop body by one or more first intermediate operations and at least one second reduction operation, wherein each of the one or more first intermediate operations is operable for calculating one more intermediate results, wherein each first intermediate operation is associated with a unique group of data units and are parallelly-executable, wherein the at least one second reduction operation is executed within the loop body following a completion of an execution of the one or more first intermediate operations, and wherein at least one second reduction operation comprises retrieval of the intermediate results and further processing of the intermediate results.

In Example 14, the subject matter of Example 13 includes, wherein the one or more first intermediate operations are order-sensitive, and wherein the retrieval is an order-preserving retrieval.

In Example 15, the subject matter of Examples 13-14 includes, wherein the one or more first intermediate operations are sum operations that involve adding elements of different input vectors to a sum variable; wherein each one of the different intermediate operations comprises summing elements of a dedicated input vector to provide a plurality of intermediate results; and wherein the at least one second operation comprises retrieving the plurality of intermediate results per input vector in an interleaved manner.

In Example 16, the subject matter of Examples 13-15 includes, wherein the one or more first intermediate operations are conditional reduction operations, and wherein the retrieval is a condition fulfillment-based retrieval.

In Example 17, the subject matter of Example 16 includes, wherein the one or more first intermediate operations involve (a) calculating the reduction operations regardless of fulfillment of one or more conditions associated with the conditional reduction operations to provide plurality of intermediate results; (b) generating condition metadata indicative of fulfillment or an unfulfillment of each condition of the one or more conditions; and wherein the at least one second operation comprises processing the plurality of intermediate results based on the condition metadata.

In Example 18, the subject matter of Example 17 includes, wherein the condition metadata is a vector that indicates a fulfillment or an unfulfillment of the one or more conditions per iteration of the loop body.

In Example 19, the subject matter of Examples 13-18 includes, wherein the vectorizing comprises allocating memory resources to (a) the execution of the one or more first intermediate operations, and (b) the execution of the at least one second reduction operation.

Example 20 is a non-transitory computer readable medium for vectorizing a loop comprising instructions, which when executed by a computer, cause the computer to perform operations comprising: receiving, by a compiler, an input code that comprises a loop body and a repetition criterion for controlling repetitions of the loop body; wherein the loop body comprises reduction operations, wherein different reduction operations are associated with different groups of data units, and wherein the reduction operations are at least one out of (a) conditional reduction operations, and (b) order-sensitive reduction operations; and vectorizing, by the compiler, the input code to provide a vectorized output code; wherein the vectorizing comprises: (i) replacing the reduction operations within the loop body by intermediate reduction operations for calculating intermediate results, wherein the intermediate reduction operations are associated with a unique group of data units and are parallelly-executable; and (ii) adding a new reduction operation to be executed following a completion of an execution of the repetitions of the loop body, wherein the new reduction operation comprises retrieval of the intermediate results and further processing of the intermediate results.

In Example 21, the subject matter of Example 20 includes, wherein the intermediate reduction operations are order-sensitive, and wherein the retrieval is an order-preserving retrieval.

In Example 22, the subject matter of Examples 20-21 includes, wherein the first intermediate reduction operations are sum operations that involve adding elements of different input vectors to a sum variable; wherein each one of the different intermediate reduction operations comprises summing elements of a dedicated input vector to provide a plurality of intermediate results; and wherein the at least one second operation comprises retrieving the plurality intermediate results per input vector in an interleaved manner.

In Example 23, the subject matter of Examples 20-22 includes, wherein the first intermediate reduction operations are conditional reduction operations, and wherein the retrieval is a condition fulfillment-based retrieval.

In Example 24, the subject matter of Example 23 includes, wherein the first intermediate reduction operations involve (a) calculating the reduction operations regardless of fulfillment of one or more conditions associated with the conditional reduction operations to provide plurality of intermediate results; (b) generating condition metadata indicative of fulfillment or an unfulfillment of each condition of the one or more conditions; and wherein the new reduction operation comprises processing the plurality of intermediate results based on the condition metadata.

In Example 25, the subject matter of Example 24 includes, wherein the condition metadata is a vector that indicates a fulfillment or an unfulfillment of the one or more conditions per iteration of the loop body.

In Example 26, the subject matter of Examples 20-25 includes, wherein the vectorizing comprises allocating memory resources to (a) the execution of the first intermediate reduction operations, and (b) the execution of the at least one second reduction operation.

Example 27 is at least one machine-readable medium including instructions that, when executed by processing circuitry, cause the processing circuitry to perform operations to implement of any of Examples 1-26.

Example 28 is an apparatus comprising means to implement of any of Examples 1-26.

Example 29 is a system to implement of any of Examples 1-26.

Example 30 is a method to implement of any of Examples 1-26.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also, for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the scope of the present disclosure

What is claimed is:

1. A method for vectorizing a loop, comprising:
receiving, by a compiler operating on a computing system, input code that comprises a loop that operates on a first array of elements and a second array of elements, wherein during an iteration of the loop a first operation is performed on an element of the first array of elements, or a second operation is performed on an element of the second array of elements;
generating a first compound operation that operates on a predetermined number of elements of the first array of elements, the first compound operation resulting in a first intermediate vector, wherein the first compound operation is executed in parallel in hardware;
generating a second compound operation that operates on the predetermined number of elements of the second array of elements, the second compound operation resulting in a second intermediate vector, wherein the second compound operation is executed in parallel in hardware;
interleaving the first intermediate vector and the second intermediate vector to produce an interleaved result, and storing the interleaved result in a temporary vector; and summing the interleaved result in the temporary vector using an order-preserving sum.

2. The method of claim 1, wherein the first compound operation performed on the elements of the first array of elements is an aggregation operation.

3. The method of claim 2, wherein the aggregation operation comprises multiplying the element of the first array with a constant value to obtain a result, and adding the result to a running sum.

4. The method of claim 1, wherein the input code includes a third array of logical elements to control whether to execute the first compound operation or the second compound operation, for a given index of the third array, first array, and second array.

5. The method of claim 4, wherein summing the interleaved result uses the predetermined number of elements of the third array of logical elements that correspond to the predetermined number of elements of the first array and the predetermined number of elements of the second array, to conditionally sum an element from the first or second intermediate vector.

6. The method of claim 4, wherein interleaving the first intermediate vector and the second intermediate vector and storing the interleaved result in the temporary vector comprises interleaving elements of the first intermediate vector and the second intermediate vector conditionally, based on a corresponding predetermined number of elements of the third array of logical elements.

7. A non-transitory computer-readable medium for vectorizing a loop, including instructions, which when executed by a computer, cause the computer to perform operations comprising:
receiving, by a compiler operating on a computing system, input code that comprises a loop that operates on a first array of elements and a second array of elements, wherein during an iteration of the loop a first operation is performed on an element of the first array of elements, or a second operation is performed on an element of the second array of elements;

generating a first compound operation that operates on a predetermined number of elements of the first array of elements, the first compound operation resulting in a first intermediate vector, wherein the first compound operation is executed in parallel in hardware;

generating a second compound operation that operates on the predetermined number of elements of the second array of elements, the second compound operation resulting in a second intermediate vector, wherein the second compound operation is executed in parallel in hardware;

interleaving the first intermediate vector and the second intermediate vector and storing the interleaved result in a temporary vector; and summing the interleaved result in the temporary vector using an order-preserving sum.

8. The non-transitory computer-readable medium of claim 7, wherein the first compound operation performed on the elements of the first array of elements is an aggregation operation.

9. The non-transitory computer-readable medium of claim 8, wherein the aggregation operation comprises multiplying the element of the first array with a constant value to obtain a result, and adding the result to a running sum.

10. The non-transitory computer-readable medium of claim 7, wherein the input code includes a third array of logical elements to control whether to execute the first compound operation or the second compound operation, for a given index of the third array, first array, and second array.

11. The non-transitory computer-readable medium of claim 10, wherein summing the interleaved result uses the predetermined number of elements of the third array of logical elements that correspond to the predetermined number of elements of the first array and the predetermined number of elements of the second array, to conditionally sum an element from the first or second intermediate vector.

12. The non-transitory computer-readable medium of claim 10, wherein interleaving the first intermediate vector and the second intermediate vector and storing the interleaved result in the temporary vector comprises interleaving elements of the first intermediate vector and the second intermediate vector conditionally, based on a corresponding predetermined number of elements of the third array of logical elements.

13. A method for vectorizing a loop, comprising:
receiving, by a compiler, an input code that comprises a loop body and a repetition criterion for controlling repetitions of the loop body, wherein the loop body comprises reduction operations and additional operations, wherein different reduction operations are associated with different groups of data units, and wherein the reduction operations are at least one out of (a) conditional reduction operations, and (b) order-sensitive reduction operations; and vectorizing, by the compiler, the input code to provide a vectorized output code, wherein the vectorizing comprises:
replacing the reduction operations within the loop body by one or more first intermediate operations and at least one second reduction operation,
wherein each of the one or more first intermediate operations is operable for calculating one more intermediate results, wherein each first intermediate operation is associated with a unique group of data units and are parallelly-executable,
wherein the at least one second reduction operation is executed within the loop body following a completion of an execution of the one or more first intermediate operations, and
wherein at least one second operation comprises retrieval of the intermediate results and further processing of the intermediate results.

14. The method according to claim 13 wherein the one or more first intermediate operations are order-sensitive, and wherein the retrieval is an order-preserving retrieval.

15. The method according to claim 13 wherein the one or more first intermediate operations are sum operations that involve adding elements of different input vectors to a sum variable; wherein each one of the different intermediate operations comprises summing elements of a dedicated input vector to provide a plurality of intermediate results; and wherein the at least one second operation comprises retrieving the plurality of intermediate results per input vector in an interleaved manner.

16. The method according to claim 13 wherein the one or more first intermediate operations are conditional reduction operations, and wherein the retrieval is a condition fulfillment-based retrieval.

17. The method according to claim 16, wherein the one or more first intermediate operations involve (a) calculating the reduction operations regardless of fulfillment of one or more conditions associated with the conditional reduction operations to provide plurality of intermediate results; (b) generating condition metadata indicative of fulfillment or an unfulfillment of each condition of the one or more conditions; and wherein the at least one second operation comprises processing the plurality of intermediate results based on the condition metadata.

18. The method according to claim 17, wherein the condition metadata is a vector that indicates a fulfillment or an unfulfillment of the one or more conditions per iteration of the loop body.

19. The method according to claim 13 wherein the vectorizing comprises allocating memory resources to (a) the execution of the one or more first intermediate operations, and (b) the execution of the at least one second reduction operation.

20. A non-transitory computer readable medium for vectorizing a loop comprising instructions, which when executed by a computer, cause the computer to perform operations comprising:
receiving, by a compiler, an input code that comprises a loop body and a repetition criterion for controlling repetitions of the loop body, wherein the loop body comprises reduction operations, wherein different reduction operations are associated with different groups of data units, and wherein the reduction operations are at least one out of (a) conditional reduction operations, and (b) order-sensitive reduction operations; and vectorizing, by the compiler, the input code to provide a vectorized output code, wherein the vectorizing comprises:
(i) replacing the reduction operations within the loop body by intermediate reduction operations for calculating intermediate results, wherein the intermediate reduction operations are associated with a unique group of data units and are parallelly-executable; and
(ii) adding a new reduction operation to be executed following a completion of an execution of the repetitions of the loop body, wherein the new reduction operation comprises retrieval of the intermediate results and further processing of the intermediate results.

21. The non-transitory computer readable medium according to claim 20, wherein the intermediate reduction operations are order-sensitive, and wherein the retrieval is an order-preserving retrieval.

22. The non-transitory computer readable medium according to claim 20, wherein the intermediate reduction operations are sum operations that involve adding elements of different input vectors to a sum variable, wherein each one of the different intermediate reduction operations comprises summing elements of a dedicated input vector to provide a plurality of intermediate results, and wherein the at least one second operation comprises retrieving the plurality intermediate results per input vector in an interleaved manner.

23. The non-transitory computer readable medium according to claim 20, wherein the intermediate reduction operations are conditional reduction operations, and wherein the retrieval is a condition fulfillment-based retrieval.

24. The non-transitory computer readable medium according to claim 23, wherein the intermediate reduction operations involve (a) calculating the reduction operations regardless of fulfillment of one or more conditions associated with the conditional reduction operations to provide plurality of intermediate results; (b) generating condition metadata indicative of fulfillment or an unfulfillment of each condition of the one or more conditions; and wherein the new reduction operation comprises processing the plurality of intermediate results based on the condition metadata.

25. The non-transitory computer readable medium according to claim 24, wherein the condition metadata is a vector that indicates a fulfillment or an unfulfillment of the one or more conditions per iteration of the loop body.

26. The non-transitory computer readable medium according to claim 20, wherein the vectorizing comprises allocating memory resources to (a) the execution of the intermediate reduction operations, and (b) the execution of the at least one second reduction operation.

* * * * *